(12) United States Patent
Huang et al.

(10) Patent No.: US 8,662,692 B2
(45) Date of Patent: Mar. 4, 2014

(54) TOUCH PANEL USING ASSEMBLING FRAME FOR ASSEMBLY

(75) Inventors: Hsin-Fu Huang, Kaohsiung (TW); Yu-Kai Huang, Kaohsiung (TW)

(73) Assignee: HannStar Display Corp., Wugu Dist., New Taipei (TW)

( * ) Notice: Subject to any disclaimer, the term of this patent is extended or adjusted under 35 U.S.C. 154(b) by 329 days.

(21) Appl. No.: 13/251,302

(22) Filed: Oct. 3, 2011

(65) Prior Publication Data

US 2013/0021778 A1 Jan. 24, 2013

(30) Foreign Application Priority Data

Jul. 22, 2011 (TW) .............................. 100125940 A (51) Int. Cl.
*G09F 13/04* (2006.01)

(52) U.S. Cl.
USPC ........................................................ 362/97.1

(58) Field of Classification Search
USPC ................................ 362/97.1–97.4, 581, 549
See application file for complete search history.

(56) References Cited

U.S. PATENT DOCUMENTS

| | | | |
|---|---|---|---|
| 6,421,235 B2 * | 7/2002 | Ditzik ........................ | 361/679.3 |
| 8,270,148 B2 * | 9/2012 | Griffith et al. ........... | 361/679.01 |
| 8,472,166 B2 * | 6/2013 | Kubo ........................... | 361/600 |

* cited by examiner

*Primary Examiner* — Vip Patel
(74) *Attorney, Agent, or Firm* — Winston Hsu; Scott Margo (57) ABSTRACT

In a touch panel, a cover lens, a sensor unit, and a panel cell are assembled first via glue to form a panel component, where a concave portion is also formed at the side of the panel component. An assembling frame is used to extend into the concave portion and covering around the side and bottom of a backlight module so as to assemble the panel component with the backlight module. Wrapping tape and further fixtures that were used to combine the backlight module and the cell may be removed to reduce the overall cost of the touch panel, while the yield rate of the adhering process may be effectively promoted since the adhering process is done simply on glass components.

14 Claims, 9 Drawing Sheets

TOUCH PANEL USING ASSEMBLING FRAME FOR ASSEMBLY

BACKGROUND OF THE INVENTION

1. Field of the Invention

The invention relates to a touch panel, and more particularly, to a touch panel using assembling frame for assembling a backlight module and a panel component.

2. Description of the Prior Art

Of all the consumers' electronic products, portable devices such as tablet computers, personal digital assistants (PDA), mobile phones, smart phones, portable navigation devices (PND), and media players have widely adopted touch panel as human-machine communication interface, which extensively reduces the size of these electronic products. As for the assembling process of conventional touch panel module, the cover lens is first combined with the sensor unit via glue (or aqueous adhesive), which is called the first stage sealant procedure. The touch module which has the combined cover lens and the sensor unit are then combined with the panel cell, which is already assembled in the panel module, via glue and this is called the second stage sealant procedure.

The panel cell and the backlight module should be assembled first, using wrapping tape and fixtures around the four sides, in the assembling process of panel module. Then the assembled panel module is combined with the touch module via glue. Such assembling process, however, takes more steps, together with the wrapping tapes and fixtures used in the process increasing overall weight and cost of the product. Furthermore, the second stage sealant procedure between the sensor unit and the panel cell easily causes bubbles, lack of sealant, sealant permeation/overflow to the backlight module that may rise up to 30% of defective rate.

SUMMARY OF THE INVENTION

To solve the problem occurred in touch panel assembly mentioned above, embodiments of the invention provide a touch panel using an assembling frame for assembly. The touch panel includes a cover lens, a sensor unit, a panel cell, a backlight module, and an assembling frame. A first side of the sensor unit is combined with the cover lens via glue. The panel cell is combined with a second side of the sensor unit via glue. The cover lens, the sensor unit, and the panel cell form a panel component, wherein a concave portion is formed at a side of the panel component. The backlight module is configured at a side of the panel cell opposite to the sensor unit. The assembling frame includes a first protrusion and a second protrusion. The first protrusion extends into the concave portion. The first protrusion and the second protrusion of the assembling frame surround at least a portion of the backlight module and the panel cell for fastening the backlight module with the panel component.

The touch panel provided in the embodiments of the invention uses two-way or multiple-way assembling for fastening the panel component and the backlight module, which extensively promotes the yield rate of glue procedure, while further reducing the overall weight and manufacturing cost of the product since no additional wrapping tapes and fixtures are needed.

These and other objectives of the present invention will no doubt become obvious to those of ordinary skill in the art after reading the following detailed description of the preferred embodiment that is illustrated in the various figures and drawings.

DETAILED DESCRIPTION

Embodiments of touch panel of the invention present a manufacturing process that the cover lens, the sensor unit, and the panel cell are combined together first via glue, and then an assembling frame is further used for assembling the three components with the backlight module. In such way, the touch panel may be well assembled with effectively reduced defective rate.

Figure 1:
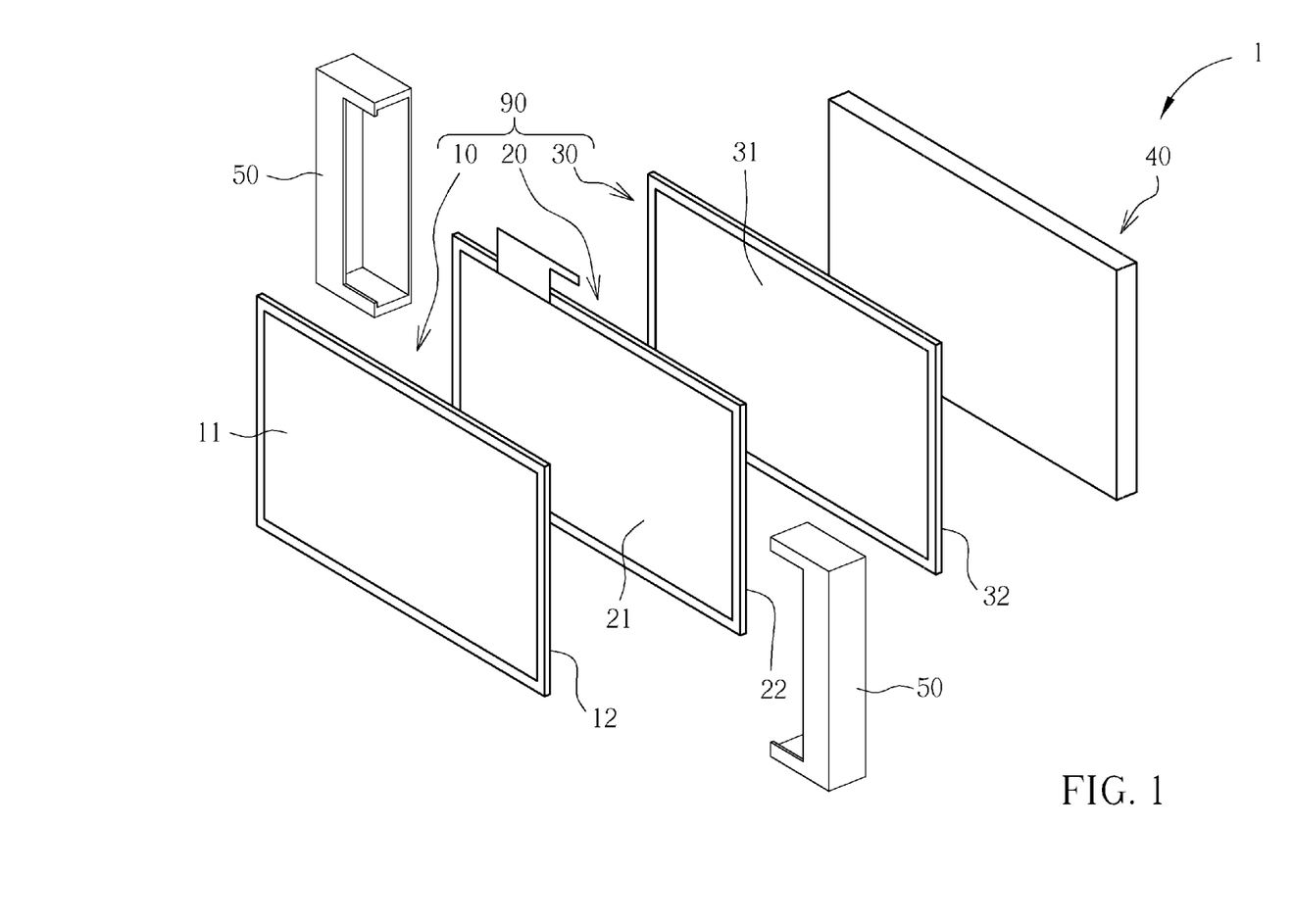
FIG. 1 is a schematic diagram showing an exploded view of all the components of a touch panel according to a first embodiment of the invention.
Figure 2:
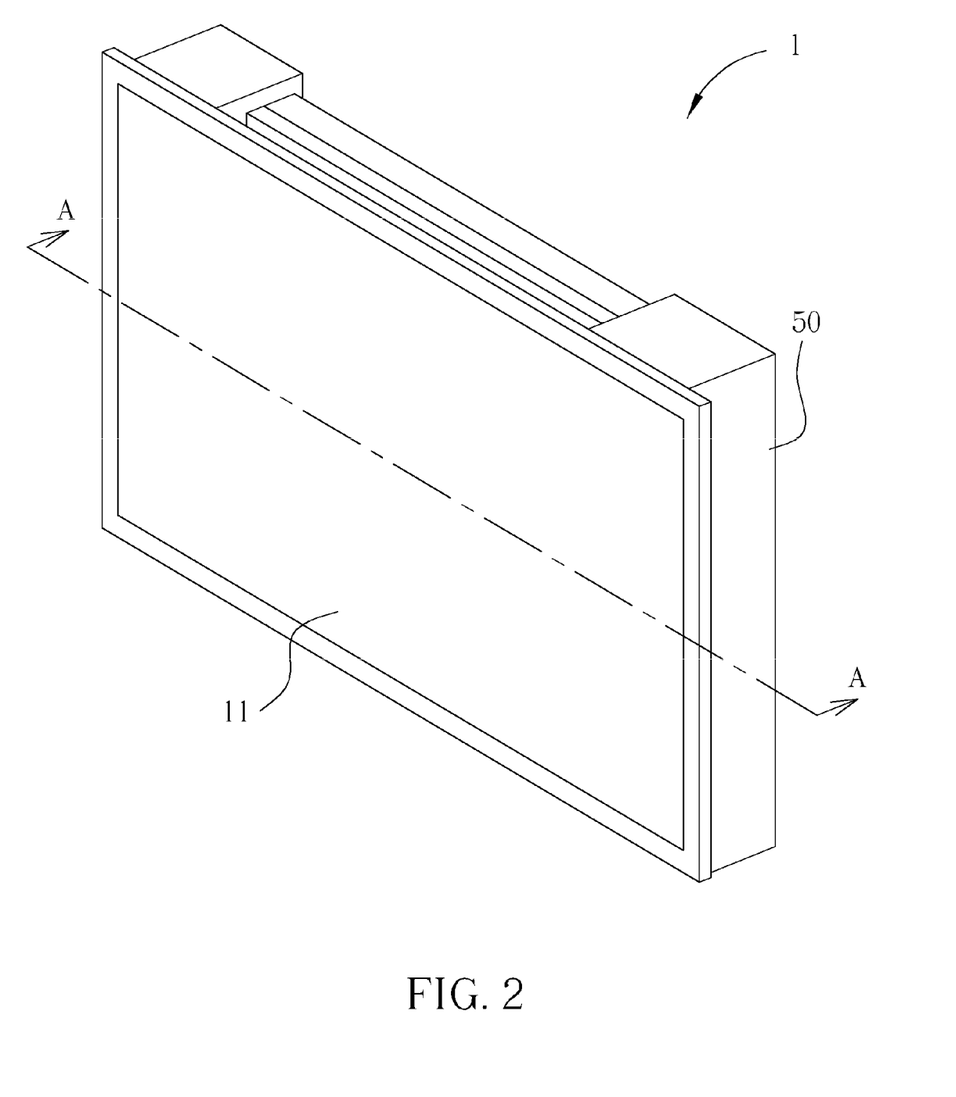
FIG. 2 is a schematic diagram of the first embodiment of touch panel in an assembled sense.

Please refer to FIG. 1 and FIG. 2. FIG. 1 is a schematic diagram showing an exploded view of all the components of a touch panel 1 according to a first embodiment of the invention, and FIG. 2 is a schematic diagram of the first embodiment of touch panel 1 in an assembled sense. The touch panel 1 includes a cover lens 10, a sensor unit 20, a panel cell 30, a backlight module 40, and an assembling frame 50. The cover lens 10 is preferably made of glass or acryl, which has a first side 11 and a second side 12 opposing to the first side 11. The sensor unit 20 has a third side 21 and a fourth side 22 opposing to the second side 12, and the panel cell 30 has a fifth side 31 and a sixth side 32 opposing to the fifth side 31.

The cover lens 10, the sensor unit 20, and the panel cell 30 are preferably and mainly made of glass. Upon assembling, the first stage glue procedure will be finished by combining the second side 20 of the cover lens 10 with the third side 21 of the sensor unit 20 via glue, which is not shown in the figures. The second stage glue procedure is finished when the fourth side 22 of the sensor unit 20 is combined with the fifth side 31 of the panel cell 30 via glue. The cover lens 10, the sensor unit 20, and the panel cell 30, which are combined with one another via glue, form a panel component 90. Practically each part of the panel component 90 is preferably made of stiff glass and as they are combined together via glue, the yield rate of the procedure can be effectively increased. There will be no issue like sealant permeation/overflow to the backlight module 40 since the backlight module 40 is not included in the glue procedure.

The assembling frame 50 is then utilized for assembling the panel component 90 with the backlight module 40, which is configured at the sixth side 32 of the panel cell 30, so that the touch panel 1 may be assembled as shown in FIG. 2. The assembling frame 50 is preferably, but not limited to, a metal frame.

Figure 3:
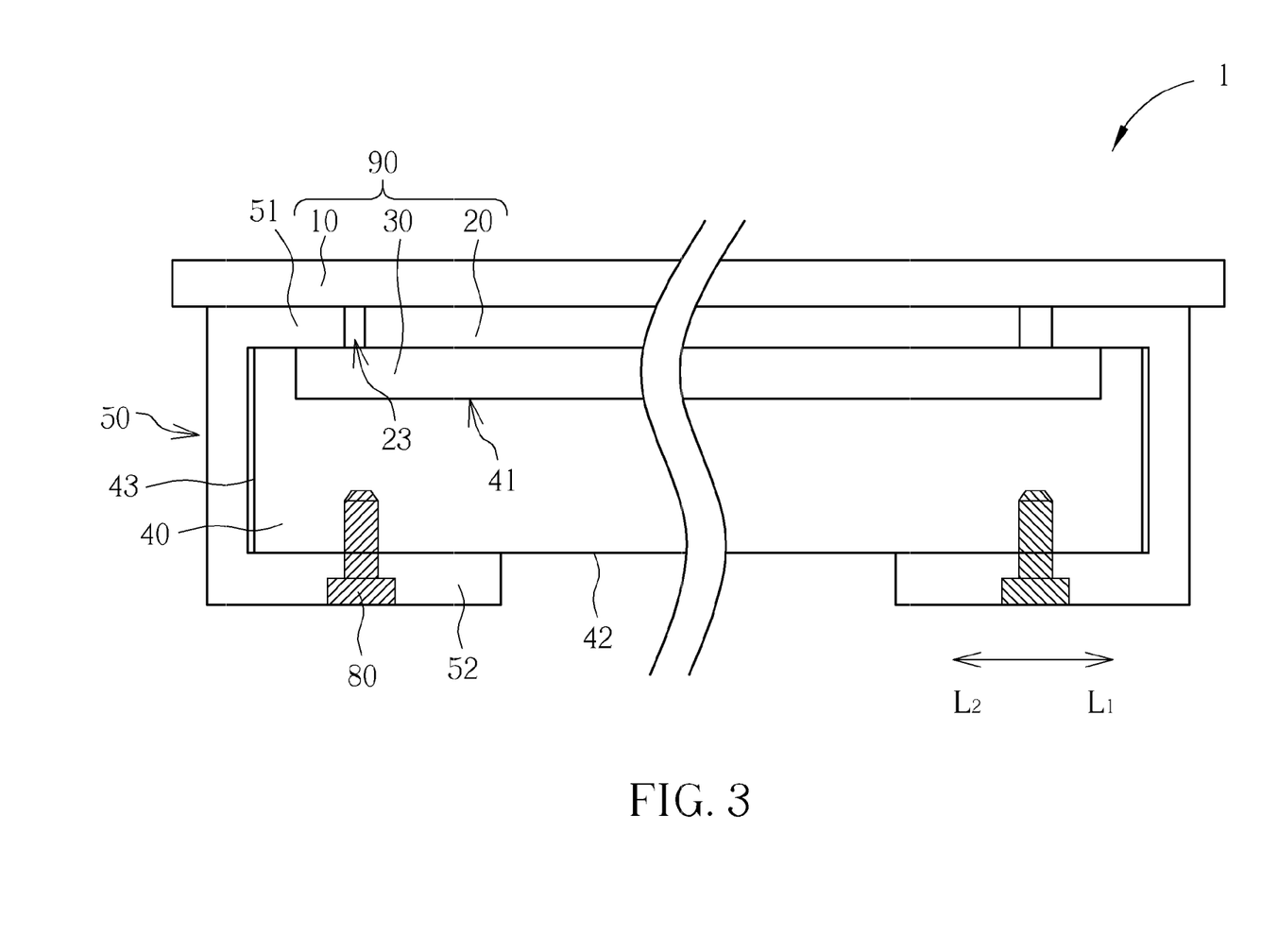
FIG. 3 is a schematic diagram of a lateral cross-sectional view of the touch panel along A-A cutting line in FIG. 2.

Please refer to FIG. 3. FIG. 3 is a schematic diagram of a lateral cross-sectional view of the touch panel 1 along A-A cutting line in FIG. 2. As mentioned, the glue combined cover lens 10, sensor unit 20, and panel cell 30 form the panel component 90 where a concave portion 23 is further formed at a side of the panel component 90, or in other words, the concave portion 23 is formed by the sensor unit 20 with respect to the cover lens 10 and the panel cell 30. Practically, the cover lens 10, the sensor unit 20, and the panel cell 30 have their lateral dimensions, along $L_1L_2$ direction in FIG. 3, in a large-small-medium relation that forms the concave portion 23. Additionally, the backlight module 40 may further include a concave part 41 where the panel cell 30 is configured.

Also as shown in FIG. 3, the assembling frame 50 is used to assemble the panel component 90 with the backlight module 40 so as to form the touch pane 1. In the embodiment in FIG. 3, also referring to FIG. 1, the assembling frame 50 assembles the panel component 90 with the backlight module 40 from two opposite sides (the left side and right side) of the panel component 90. The assembling frame 50 has U-shape cross section from the A-A cutting line in FIG. 2 and has a first protrusion 51 and a second protrusion 52. When assembling the panel component 90 with the backlight module 40 from the two opposite sides of the panel component 90, the first protrusion 51 of the assembling frame 50 extends into the concave portion 23 of the panel component 90 and adjacent to the second side 12 of the cover lens 10 and the fifth side 31 of the panel cell 30. The second protrusion 52 of the assembling frame 50 reaches to a bottom plane 42 of the backlight module 40, such that the assembling frame 50 surrounds at least a portion of the backlight module 40 and the panel cell 30 with its first protrusion 51 and second protrusion 52. In detail, the first protrusion 51 may abut against a top surface (the fifth side 31) of the panel cell 30, while the second protrusion 52 abuts against the bottom plane 42 of the backlight module 40, and the assembling frame 50 may effectively fasten the backlight module 40 with the panel cell 30, which is already tightly combined with the cover lens 10 and the sensor unit 20. In such way, the assembling frame 50 directly may assemble the panel component 90 with the backlight module 40 from two opposite sides without further using glue or other additional fixing method between the backlight module 40 and the panel cell 30.

Figure 4:
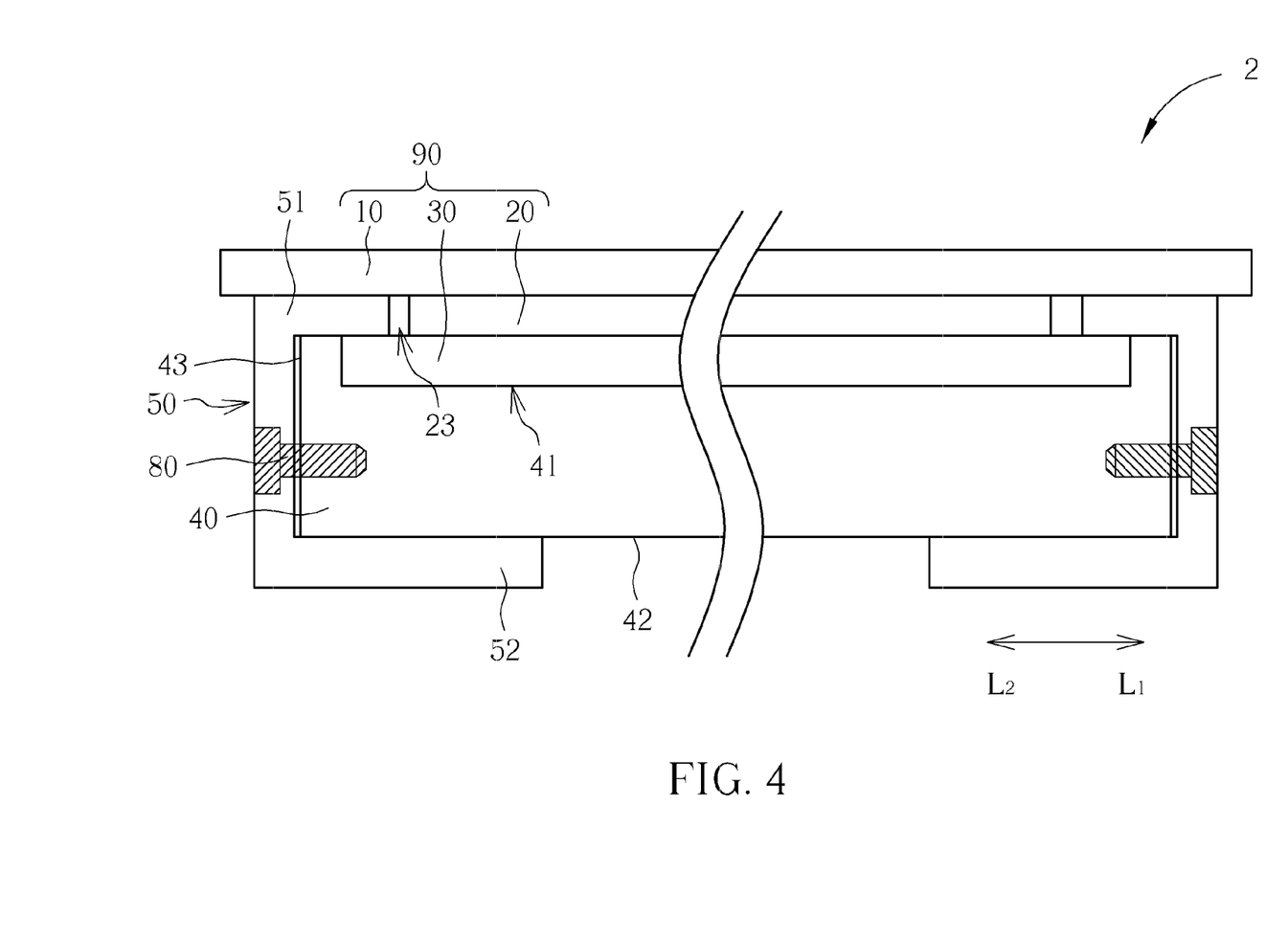
FIG. 4 is a schematic diagram of a lateral cross-sectional view of the touch panel according to a second embodiment.
Figure 5:
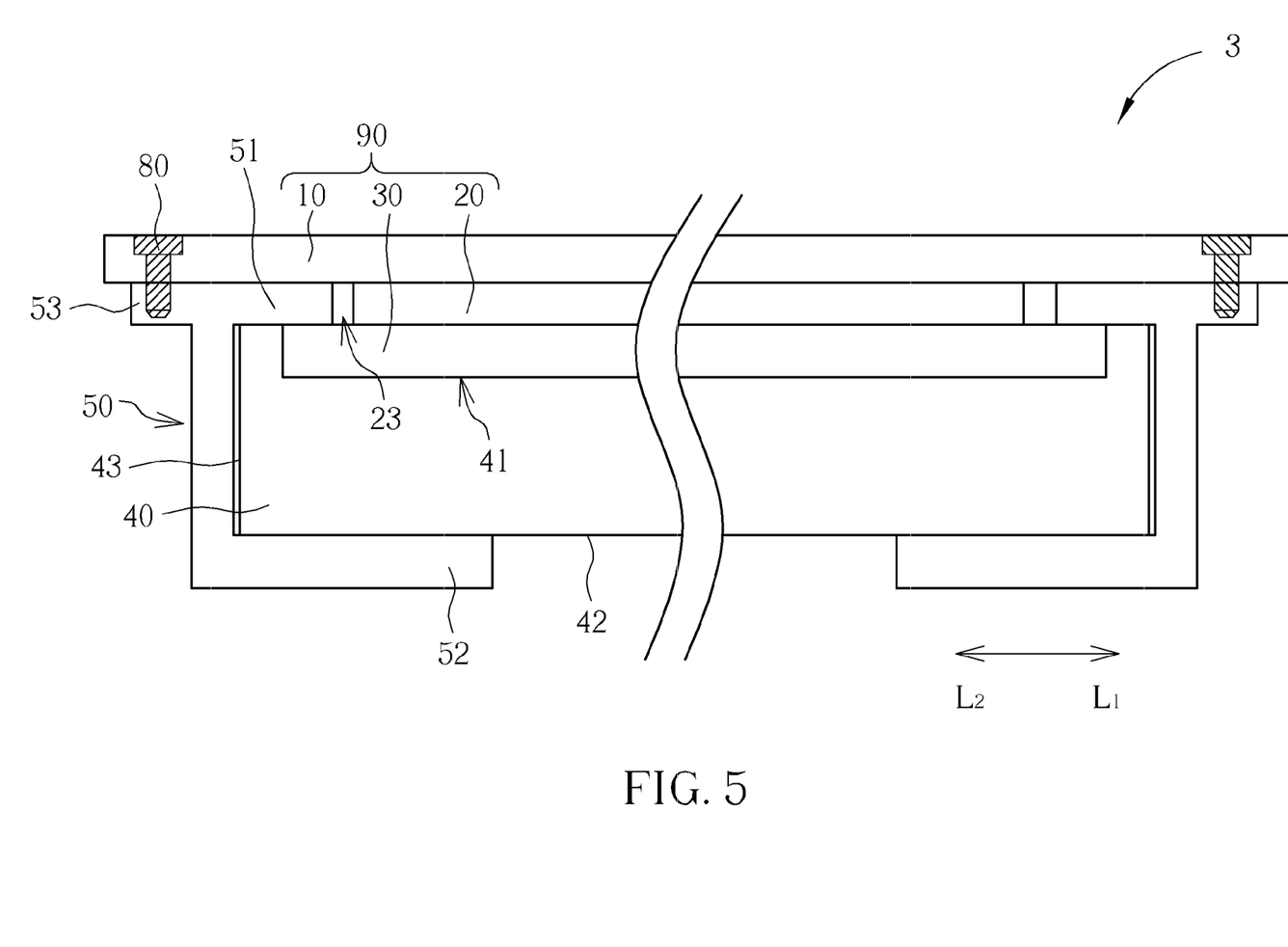
FIG. 5 is a schematic diagram of a lateral cross-sectional view of the touch panel according to a third embodiment.

In the embodiment shown in FIG. 3, the touch panel 1 may further use a fastener 80, preferably bolts or screws, to directly fasten to the second protrusion 52 of the assembling frame 50 and the bottom plane 42 of the backlight module 40. Such structure also uses fewer screws than conventional one. Additionally, the fastener 80 may also be configured to fasten to the assembling frame 50 and a side plane 43 of the backlight module 40 as shown in a second embodiment of touch panel 2 in FIG. 4. Still in another embodiment of touch panel 3, the third embodiment as shown in FIG. 5, assembling frame 50 may include an extending section 53 extending oppositely with respect to the first protrusion 51 as shown in the figure, while the fastener 80 fastens to the cover lens 10 and the extending section 53 of the assembling frame 60. In the embodiment in FIG. 5, cover lens 10 and the extending section 53 of the assembling frame 50 may also directly be combined via glue, I.e., the fastener 80 may also be implemented as a form of glue.

Figure 6:
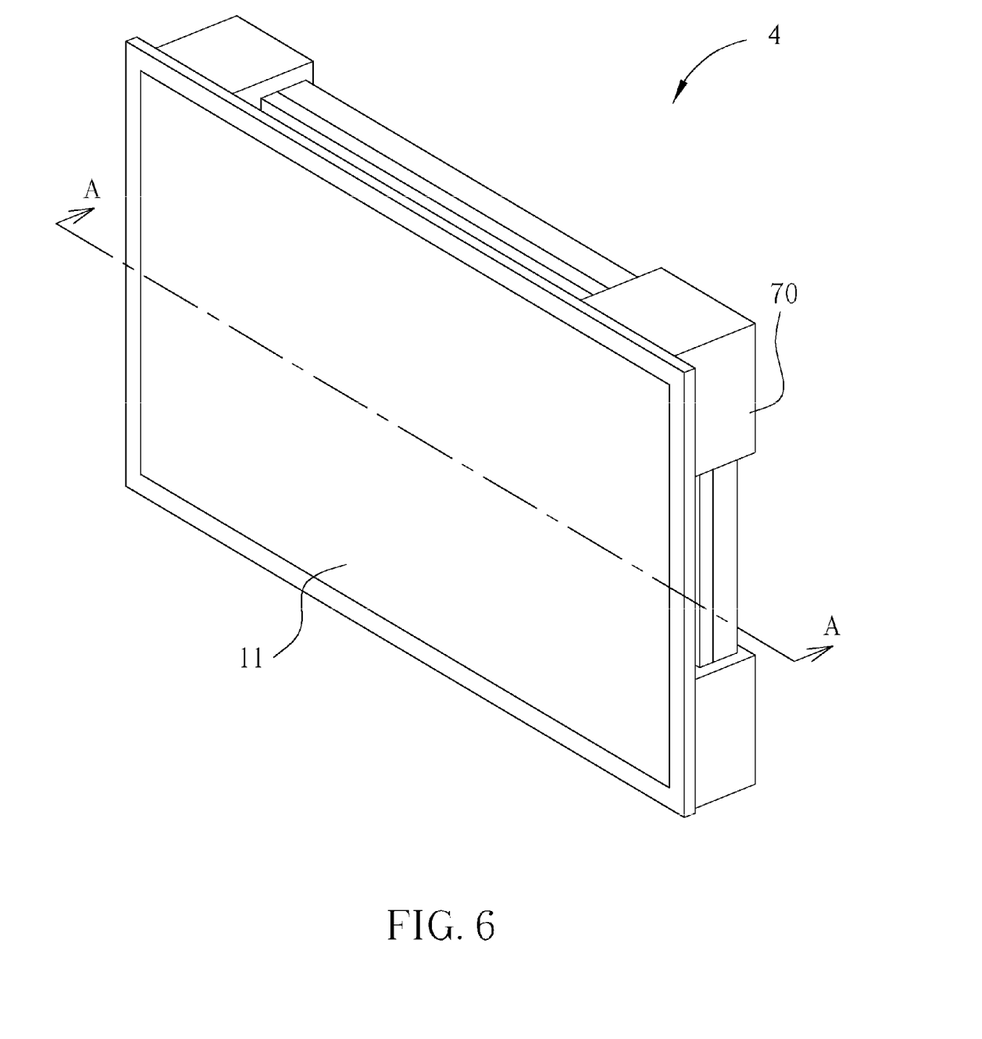
FIG. 6 is a schematic diagram of the touch panel according to a fourth embodiment.
Figure 7:
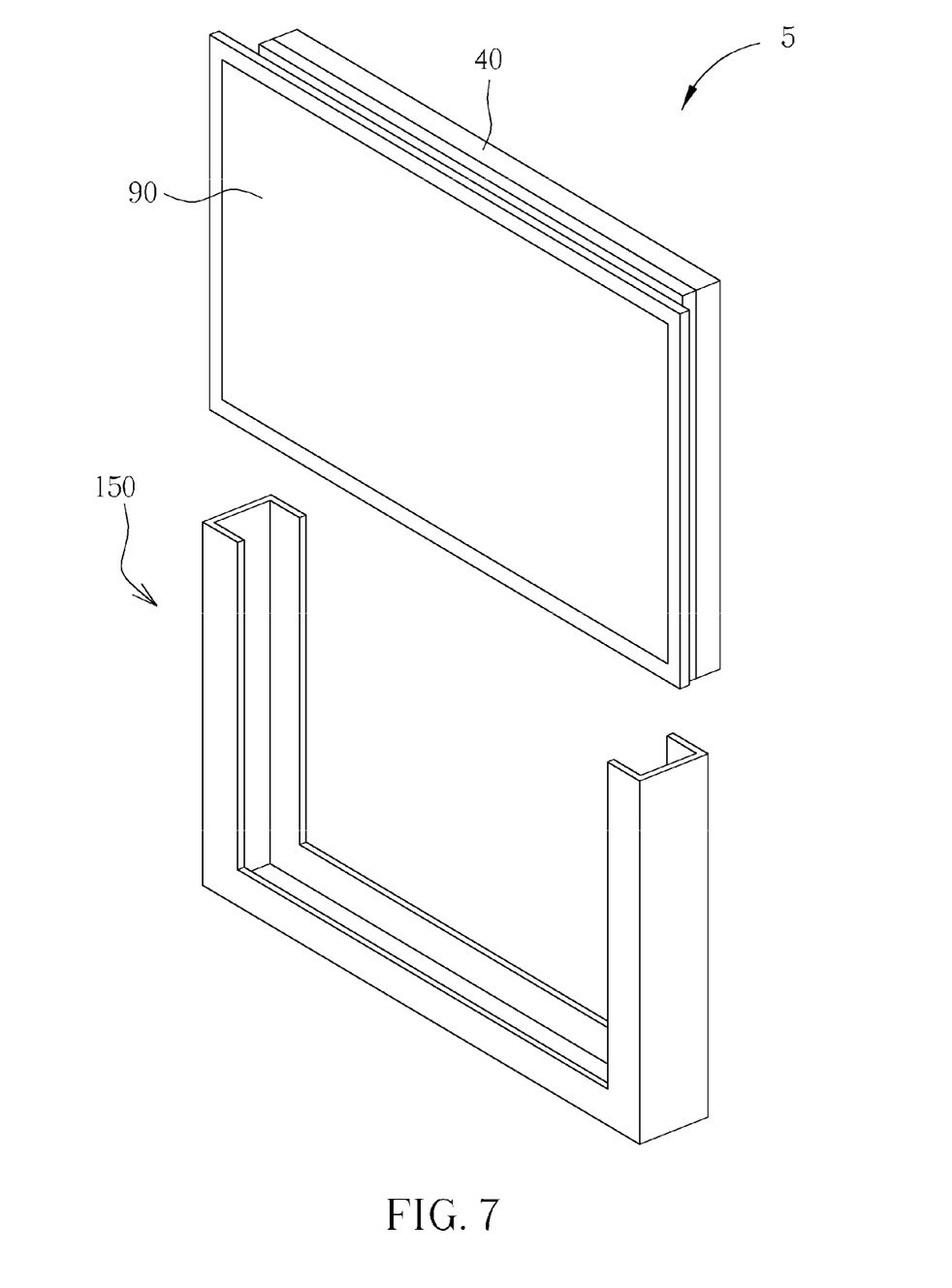
FIG. 7 is a schematic diagram of the touch panel according to a fifth embodiment.
Figure 8:
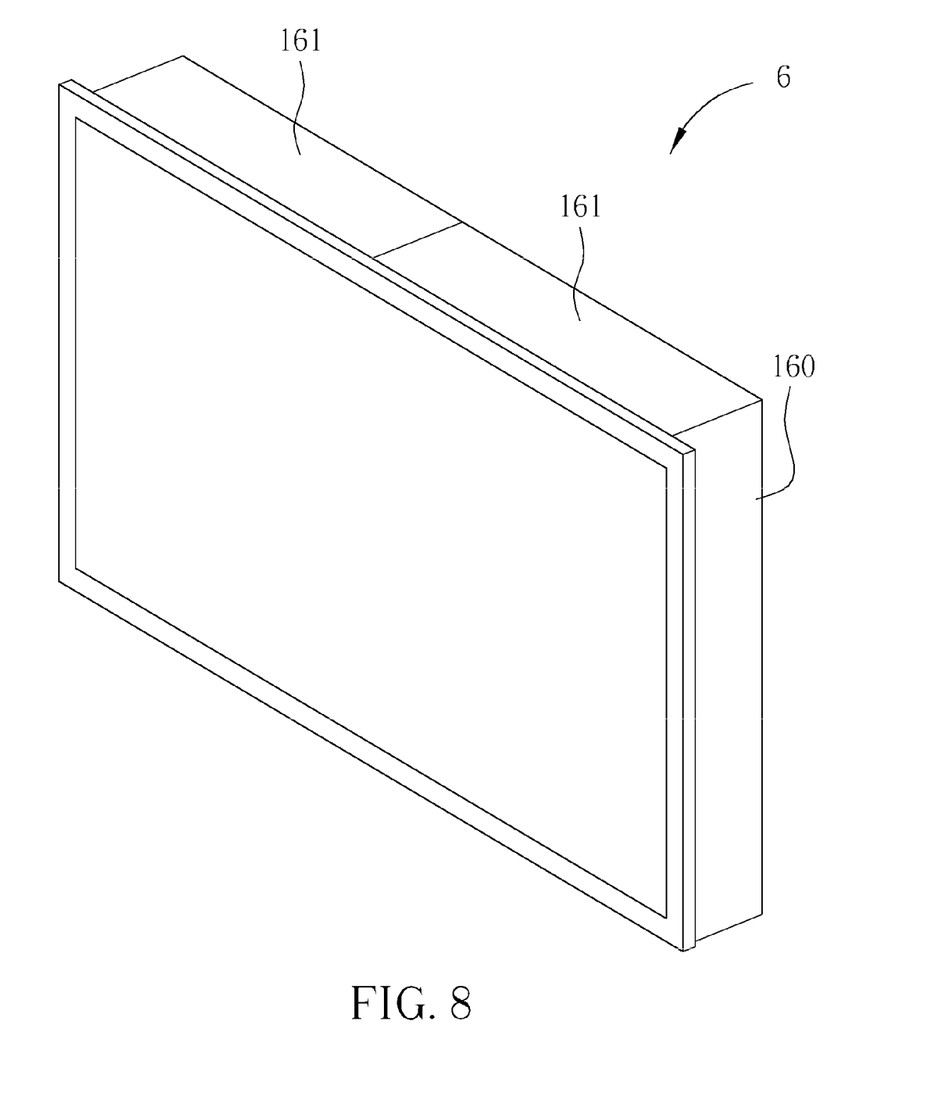
FIG. 8 is a schematic diagram of the touch panel according to a sixth embodiment.
Figure 9:
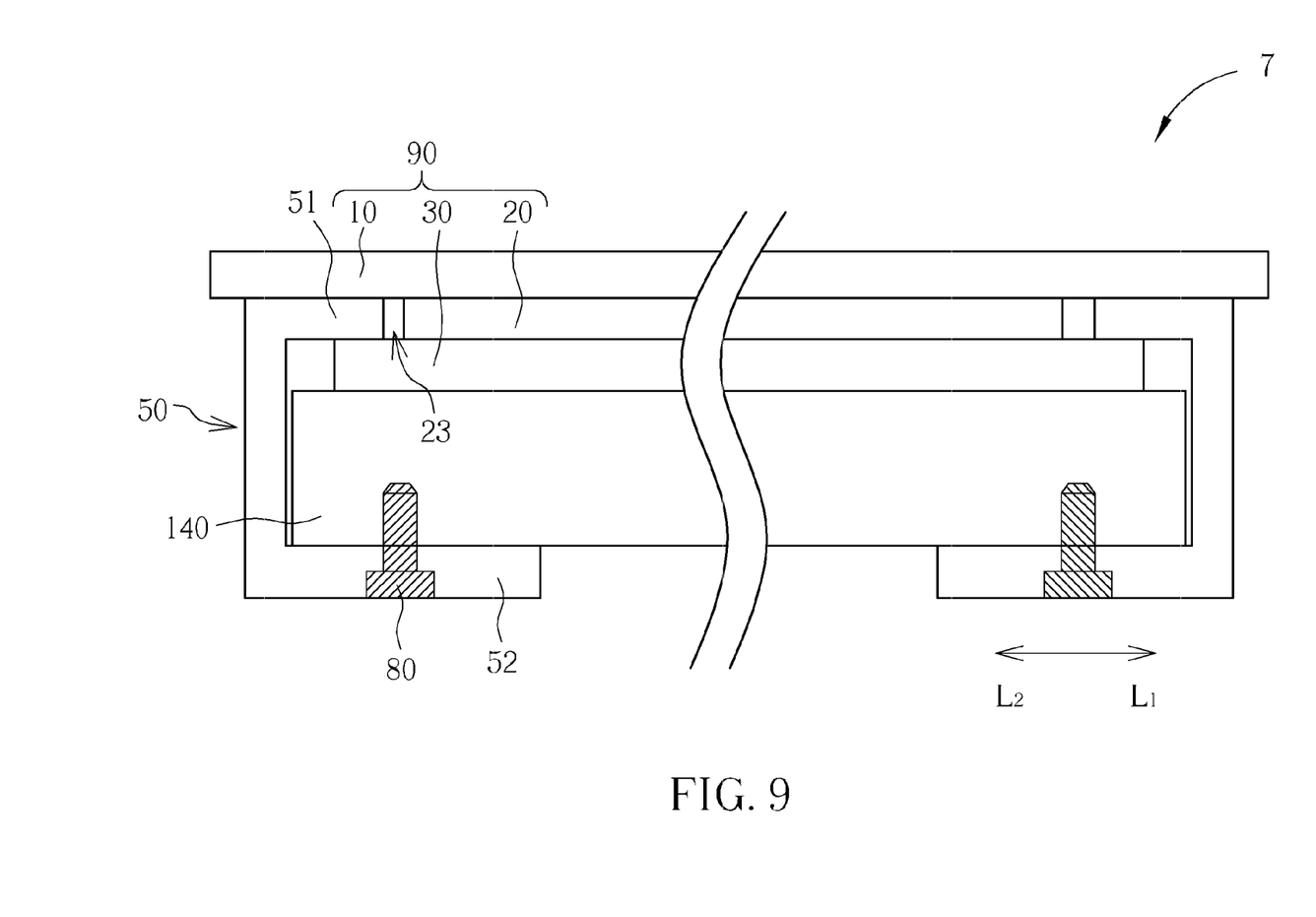
FIG. 9 is a schematic diagram of a lateral cross-sectional view of the touch panel according to a seventh embodiment.

Please refer to FIG. 6, FIG. 7, and FIG. 8. FIG. 6 is a schematic diagram showing an assembled fourth embodiment of a touch panel 4 according to the invention, FIG. 7 is a schematic diagram of a fifth embodiment of a touch panel 5 where an assembling frame 150 is separately shown from other components, and FIG. 8 is a schematic diagram of a sixth embodiment of touch panel 6 according to the invention. The embodiment in FIG. 6 shows that an assembling frame 70 may also be implemented as four L-shape units that assemble the panel component 90 with the backlight module 40 from four corners of the panel component 90 and the backlight module 40. The assembling frame 150 in FIG. 7 is a single U-shape component which assembles the panel component 90 with the backlight module 40 from three sides of the panel component 90. An assembling frame 160 in the embodiment shown in FIG. 8 is similar as the embodiment shown in FIG. 2, while first protrusions 161 of the two assembling frames 160 reach to each other after assembled to the backlight module and the panel component. The second protrusions of the assembling frames 160 are not shown in FIG. 8 but have the same characteristic as the first protrusions 161. Still in another embodiment of the invention, the panel cell of the touch panel may be put directly on the backlight module to be assembled altogether by the assembling frame, I.e., the backlight module doesn't have to use an concave part to accommodate the panel cell. The embodiment as shown in FIG. 9 illustrates that the panel cell 30 of a touch panel 7 is placed directly on the backlight module 140, which has no concave part 41 as the embodiment in FIG. 3. The backlight module 140 and the panel component 90 may also be assembled by the assembling frame 50 using the structure in the invention.

The touch panel disclosed in the embodiments of the invention puts the cover lens, the sensor unit, and the panel cell together first via glue to form the panel component, where the concave portion is formed at the side of the panel component. The assembling frame is used to extend into the concave portion and covering around the side and bottom of the backlight module so as to assemble the panel component with the backlight module. Wrapping tape and further fixtures that were used to combine the backlight module and the cell may be removed to reduce the overall cost of the touch panel, while the yield rate of the adhering process may be effectively promoted since the adhering process is done simply on glass components.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch panel using an assembling frame for assembly, comprising:
   a cover lens;
   a sensor unit, a first side of the sensor unit combined with the cover lens via glue;
   a panel cell, combined with a second side of the sensor unit via glue, the cover lens, the sensor unit, and the panel cell forming a panel component, wherein a concave portion is formed at a side of the panel component;
   a backlight module, configured at a side of the panel cell opposite to the sensor unit; and
   an assembling frame, comprising a first protrusion and a second protrusion, the first protrusion extending into the concave portion, the first protrusion and the second protrusion of the assembling frame surrounding at least a portion of the backlight module and the panel cell for fastening the backlight module with the panel component.

2. The touch panel of claim 1, wherein the cover lens is made of glass or acryl.

3. The touch panel of claim 1, wherein the cover lens, the sensor unit, and the panel cell are made of glass, and the panel component is a stiff component.

4. The touch panel of claim 1, wherein the cross-section of the assembling frame is U-shape.

5. The touch panel of claim 1, further comprising a fastener fastening to the assembling frame and the backlight module.

6. The touch panel of claim 5, wherein the fastener fastens to the second protrusion of the assembling frame and a bottom plane of the backlight module.

7. The touch panel of claim 5, wherein the fastener fastens to the assembling frame and a side plane of the backlight module.

8. The touch panel of claim 1, wherein the assembling frame further comprises an extending section extending oppositely with respect to the first protrusion, the touch panel further comprising a fastener for fastening to the cover lens and the extending section of the assembling frame.

9. The touch panel of claim 8, wherein the fastener is screw or glue.

10. The touch panel of claim 1, wherein the backlight module comprises concave part where the panel cell is configured.

11. The touch panel of claim 1, wherein the assembling frame assembles the panel component with the backlight module from two opposite sides of the panel component.

12. The touch panel of claim 1, wherein the assembling frame assembles the panel component with the backlight module from four corners of the panel component.

13. The touch panel of claim 1, wherein the assembling frame is a U-shape component which assembles the panel component with the backlight module from three sides of the panel component.

14. The touch panel of claim 1, wherein the first protrusion of the assembling frame abuts against a top surface of the panel cell and the second protrusion of the assembling frame abuts against a bottom plane of the backlight module.

* * * * *